Oct. 12, 1943.  W. GORDON  2,331,831
SCREW-ACTUATED VISE
Filed Jan. 11, 1941  2 Sheets-Sheet 1
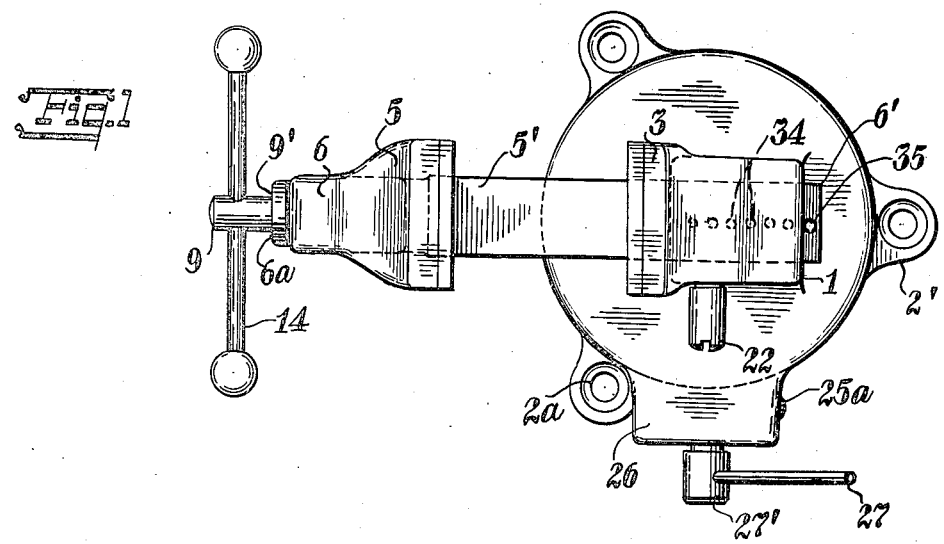
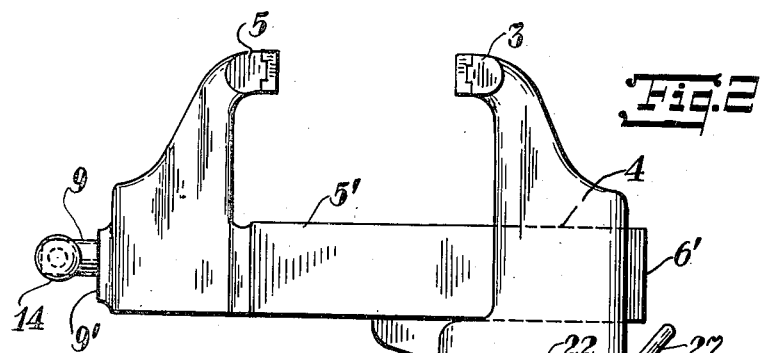
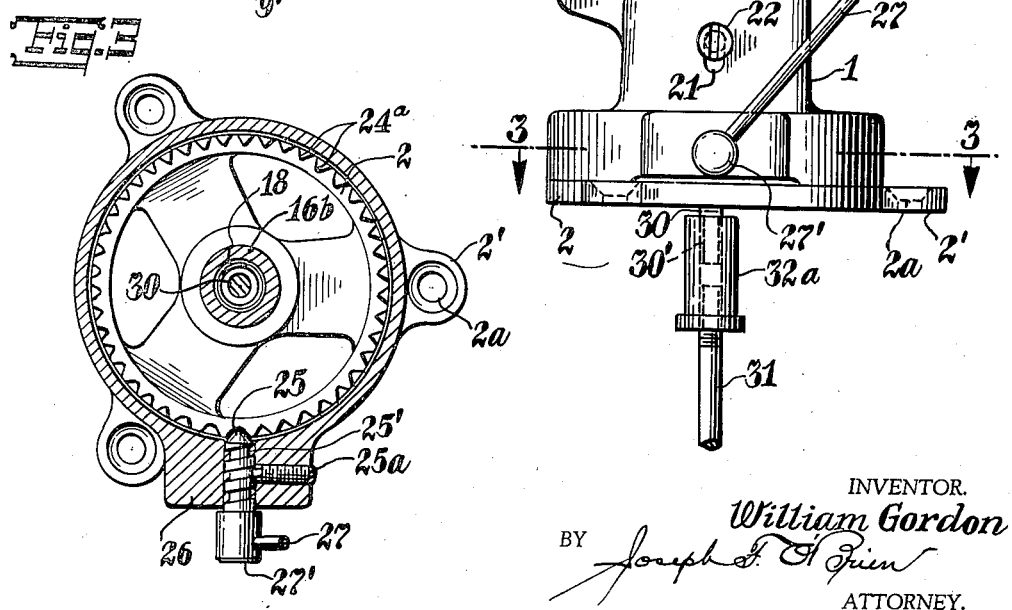
INVENTOR.
William Gordon
BY Joseph F. O'Brien
ATTORNEY.

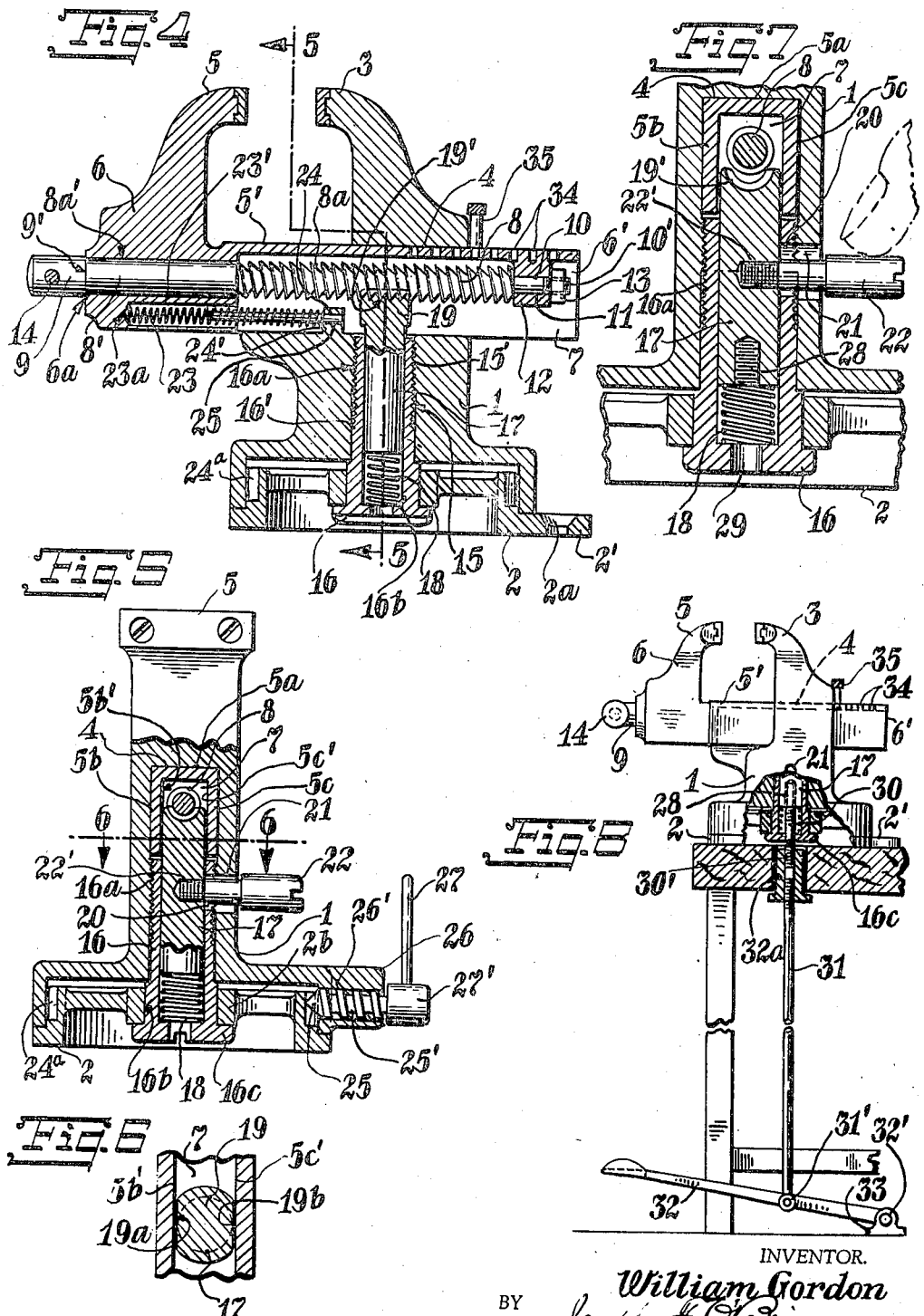

Patented Oct. 12, 1943

2,331,831

UNITED STATES PATENT OFFICE 2,331,831

SCREW-ACTUATED VISE

William Gordon, Union City, N. J.

Application January 11, 1941, Serial No. 374,022

3 Claims. (Cl. 81—36)

This invention relates to improvements in screw-actuated vises, and constitutes an improvement upon the screw-actuated vise shown and described in my former United States Letters Patent No. 1,753,924 dated the 8th day of April, 1930, which embodies a supporting body portion, jaw members, one of which is relatively stationary and the other movable relatively thereto, a screw connected with one of such jaw members and mounted thereon for rotary movement only, a sectional nut mounted for vertical movement only and having a connection with the other jaw member and provided with threads arranged to be operatively engaged with the threads of said screw, the threads of said screw and nut having complementary inclined sides arranged to permit a relative sliding movement in one direction, spring means for normally pressing the threads of said sectional nut into engagement with the threads of said screw, the parts being so arranged that direct manual pressure against the movable jaw will permit a clicking of the threads of the screw over those of the sectional nut to produce a quick closing movement of the movable jaw, means for manually disengaging the threads of said sectional nut and screw, and a spring normally cooperating with the first mentioned spring means to press the inclined threads of the screw into engagement with the inclined threads of the sectional nut and also operative upon manual disengagement of the nut to move the jaws into full open position.

One of the objects of my present invention is greatly to simplify the construction of the vise of my said patent as well as to reduce the manufacturing costs, and to this end utilizing in the supporting body a cylindrical mounting aperture for mounting the nut holder instead of the square aperture of my said patent, while at the same time I provide a screw-actuated vise which will be capable of more speedy manipulation and operation than the device of my said former patent.

Another object of my invention is to provide, in a vise, an independent nut-holding unit capable of ready and easy assembly and disassembly and also capable of ready and easy adjustment in relation to the vise screw.

Still another object of my invention is to provide a vise construction in which any looseness between the nut, its holder and the screw will be reduced to a minimum to the end that the degree of hand manipulation after initial connection to a piece of work will be minimized and the operation of gripping may be speeded up, and to this end to utilize the sliding shank of the movable jaw to hold the nut-holding member against turning movement and thus to avoid any looseness between said nut-holding member and the screw.

Another object of my invention is to provide a swivelled vise supporting body which will be capable of speedy axial movement and accurate locking upon a fixed base member and also to provide a single member adapted to simultaneously connect the base member and vise body together and to fasten the nut-holding unit within said vise body.

With these and other objects in view, the invention comprises the combination of members and arrangement of parts so combined as to coact and co-operate with each other in the performance of the functions and the accomplishment of the results herein contemplated, and comprises in one of its adaptations the species or preferred form illustrated in the accompanying drawings, in which:

Fig. 1 is a top plan view of a screw-actuated vise embodying my invention in extended position;

Fig. 2 is a side elevation of the vise shown in Fig. 1;

Fig. 3 is a section on the line 3—3 of Fig. 2 looking in the direction of the arrows;

Fig. 4 is a central vertical section of the device illustrated in Figs. 1 to 3, inclusive;

Fig. 5 is a section substantially on the line 5—5 of Fig. 4, looking in the direction of the arrows;

Fig. 6 is a fragmentary section on the line 6—6 of Fig. 5, looking in the direction of the arrows;

Fig. 7 is an enlarged fragmentary section of the lower portion of the vise body shown in Fig. 5 and illustrating the sectional nut being released from the screw by hand operation; and Fig. 8 is a view partly in side elevation and partly in section showing the sectional nut-holding member of the vise connected up with a treadle for release by the foot of the user.

Referring now to these drawings which illustrate a preferred embodiment of my invention, I indicates a fixed supporting body portion of a vise having a base portion 2 provided with attaching lugs 2' having screw apertures 2ª. The vise may, through the lugs 2', be attached to a suitable work bench or support in any suitable manner.

The upper end of the supporting body portion of the vise is formed into a stationary jaw 3 and, as shown, said body portion has a horizontal cavity 4 for the reception of a sliding shank portion 5' of a movable jaw 5 formed on a solid head 6. Said movable jaw 5 is adapted to be moved toward and away from the stationary jaw 3 by causing the shank portion 5' to be slid or moved through the cavity 4. The said movable shank portion 5' preferably comprises an inverted U-shaped channel-bar with its channel or cavity 7 opening downwardly and composed of a top web portion 5ª and side flanges 5ᵇ and 5ᶜ. The shank portion 5' preferably projects horizontally from the solid head portion 6 and terminates in an open end or tail portion 6'.

Rotatably mounted within the shank channel 7 is an actuating screw 8. As illustrated, the screw 8 is formed integrally with a shaft 8' which is journalled in a bearing aperture 8ª in the head 6 and is provided at its forward end with an operating portion 9 enlarged in relation to the shaft 8' so as to provide a shoulder portion 9' abutting against the outer face 6ª of the head 6 at the end of the bearing aperture 8ª' while its rear end is provided with a reduced bearing portion 10 which extends through an aperture 11 in a bearing block 12 formed, as shown, integrally with the shank within the channel. The rear end of the screw 8 is fastened within the channel by means of a nut 13 threaded on the end 10' of said bearing portion 10.

Mounted on the body portion and extending at a right angle to the screw and movable into and out of engagement therewith is a nut-holding unit 16. As shown, said nut-holding unit is mounted in a cylindrical vertically-disposed aperture 15 communicating with the horizontal aperture 4 within the body of the vise and intersecting the same at a right angle. In the preferred form of my invention illustrated, the nut-holding unit 16 comprises a cylindrical sleeve 16' threaded at its upper end 16ª and adapted to interengage with a top portion 15' of the aperture 15. The sleeve 16' has mounted therein a cylindrical rod 17 which is slidably mounted in said sleeve and is urged upwardly therein by a spiral spring 18 mounted within said sleeve 16'. The rod 17 is provided at its upper end with a sectional nut portion 19 having threads 19' engageable with the threads 8ª of the screw 8. The sleeve 16' has a side aperture 20 and the body portion 1 of the vise is provided with an aperture 21 adapted to register with each other and with a tapped laterally-disposed aperture 23 in the rod 17, said registering apertures 20 and 21 being adapted to permit access of a threaded end of an operating member 22 to the said laterally-disposed tapped aperture 22'. Obviously, upon connecting the operating member 22 with the cylindrical rod 17 through the apertures 20 and 21, a depression by the hand of this operating member will enable a lowering of the rod 17 and sectional nut 19 against the actuation of the spring 18 and a disconnection or disengagement of the screw threads 19' with the screw threads 8ª of the screw 8.

The screw threads 8ª have, as shown, a forward inclination and the threads 19' on the sectional nut 19 have a complementary pitch and it will be seen that the threads of the nut 19 are thus, by pressure of the spring 18, forced yieldingly into engagement with the threads 8ª of the screw and that the inclination of the screw threads and nut threads is such that the spring-pressed sectional nut acts like a pawl to permit movement in one direction so that direct manual inward pressure on the movable jaw will cause an automatic releasing or disengagement of the threads of the nut from the threads of the screw. Such manual movement will cause a clicking of the threads of the screw over the nut threads so as to enable the movable jaw 5 to be moved to its approximate gripping position.

In the preferred embodiment of my invention, manual depression through the member 22 or through a treadle as hereinafter specified will cause the release of the sectional nut from the screw, and in such preferred embodiment of my invention I also have provided means operable upon such release for automatically moving the movable jaw outwardly to open position. This automatic movement is preferably accomplished by inserting one end of a spiral spring 23 in a cavity 23' and arranging said end to abut against the bottom 23a of said cavity while the other end of the spring abuts against the side 24' of an abutment block 24 formed integrally in the lower portion of the aperture 4 on the forward part of the supporting body portion 1. A guide pin 25 fastened to the block 24 is adapted to extend within the bore of the spring 23 and to guide and retain the spring in position.

It will be seen that an inward movement of the movable jaw 5 and its head 6 will contract the spring 23, and that upon release of the sectional nut 19 from the screw 8 the spring 23 will expand and force the head 6 and the movable jaw 5 outwardly to full open position, unless such movement is obstructed as hereinafter specified.

In the form of my invention illustrated the sectional nut 19 is guided against any turning movement by fitting flattened side portions of the same snugly within the channel 7 and causing the same to abut at 19ª, 19ᵇ, against the inner surfaces 5ᵇ' and 5ᶜ' of the flanges 5ᵇ and 5ᶜ of said shank 5', it being understood that it is desirable to hold said nut 19 against turning movement and that any looseness or tendency to turn must be taken up by a rotating movement of the screw before tightening up of the jaws can be effected. As the nut member 19 is formed integrally on the rod 17 and said rod is snugly mounted within the screw-threaded sleeve 16' any looseness between said nut and the body portion of the vise is also eliminated. As a consequence of the mounting and elimination of looseness, the movable jaw may be tightened up by a very short movement of the handle bar 14 and usually can be so tightened up by a movement of less than half a turn whereas, other devices require very much greater movement of the handle bar in the tightening up of the vise jaws on an article.

In the form of my invention shown, the base 2 is of swivel construction and, as illustrated, is provided with a swivel member 2ᵇ which swivels upon the lower portion 16ᵇ of the member 16, and in the preferred embodiment of my invention illustrated, the swivel base is locked in place by a circular flange 16ᶜ on said member 16. In said preferred embodiment of my invention the swivel base member is preferably provided at its outer periphery with a series of locking teeth 24ª as more particularly shown in Figs. 3 and 5, and said swivel base is adapted to be locked in any suitable axial position by means of a pointed screw-actuated dog 25 forming the extremity of a worm member 25' movable through an aperture 26 in a head 26' by means of a handle 27 connected to a cylindrical head 27'. The worm 25 is guided in its turning movement by providing a set screw 25ᵃ having an engaging end 25ᵃ′ extending into enagagement with thread thereof.

In the preferred embodiment of my invention, I preferably provide means for a treadle release of the sectional nut. Thus, I provide in the rod 17 a tapped axial hole 28 and insert therein through an aperture 29 in the member 16 and through the bore of the spring 18, a rod 30 which is provided with a screw threaded portion 30′ at its lower end and has connected thereto a treadle rod 31 by means of a connecting nut 32ᵃ. As illustrated, the rod 31 is hingedly connected at its lower end 31′ to a foot lever 32 pivoted at 32′ to a suitable bracket 33. Obviously, upon stepping upon the foot lever 32 the rod 30 will pull down the cylindrical member 17 to move the sectional nut 19 away from the screw and permit an automatic extension movement of the movable jaw 5.

In the preferred embodiment of my invention illustrated, I also preferably provide the rear end of the shank portion with a series of apertures 34 adapted to receive a stop pin 35 for the purpose of limiting the spring-pressed movement of the jaw 5. Obviously, the pin 35 may be secured in any one of the holes 34 and then when the jaw is automatically opened, the movement thereof will be limited by the particular position of the pin 35 in one or another of the apertures 34. It will, of course, be understood that if no stop pin 35 is applied, the jaw 5 will be extended to full open position and in that event the rear surface of the nut 19 will engage the side surface of the bearing member 12.

In assembling, the spring 23 is positioned and shank member is then inserted in the horizontal aperture 4 whereupon after positioning of the base member, the nut-holding unit is passed through the aperture in the base member and into its aperture and screwed home until the apertures 20, 21 and 22′ are in alignment, whereupon the operating member 22 is applied. The connection of the treadle will be obvious.

The insertion of the nut forward of the bearing block 12 provides a master-limiting member for outward movement and prevents any such movement by the spring as would cause the shank of the jaw 5 to slip out of the body portion of the vise.

Having described my invention, I claim:

1. A screw-actuated vise embodying, in combination, a supporting body portion provided with a fixed jaw, said body portion having a horizontally-disposed cavity and a cylindrical vertically-disposed screw-threaded cavity communicating therewith, a movable jaw having a shank portion slidable within said horizontally-disposed cavity, an actuating screw having screw-threads mounted for rotary movement only within said shank portion of the movable jaw, a sectional nut provided with threads arranged to have an operative engagement with the threads of said screw, a holder unit comprising a sleeve for said sectional nut mounted in said vertically-disposed cavity, a jaw-opening spring disposed between said supporting body portion and said movable jaw and adapted, upon manual release of the screw-threads from said sectional nut, to move the movable jaw into open position, said holder unit sleeve having a screw-threaded connection with said vertically-disposed cavity to enable adjustment within the cavity of the position of the sectional nut, a rod connected with said sectional nut and mounted to have vertical movement in said holder unit sleeve, a nut-pressing spring mounted in said holder unit sleeve below said rod to press said nut into resilient engagement with the threads of the screw, and an actuating member extending through said sleeve and engaging said rod axially for treadle operation.

2. A screw-actuated vise embodying, in combination, a supporting body portion provided with a fixed jaw, said body portion having a horizontally-disposed cavity and a cylindrical vertically-disposed screw-threaded cavity communicating therewith, a movable jaw having a channel-shaped shank portion slidable within said horizontally-disposed cavity, an actuating screw having screw-threads mounted for rotary movement only within said shank portion of the movable jaw, a sectional nut provided with threads arranged to have an operative engagement with the threads of said screw and having a squared part engageable with said shank portion to retain the nut against turning movement, a holder unit comprising a sleeve for said sectional nut mounted in said vertically-disposed cavity, a jaw-opening spring disposed between said supporting body portion and said movable jaw and adapted, upon manual release of the screw-threads from said sectional nut, to move the movable jaw into open position, said holder unit sleeve having a screw-threaded connection with said vertically-disposed cavity to enable adjustment of the position of the sectional nut within the cavity, a rod connected with said sectional nut and mounted to have vertical movement in said holder unit sleeve, a nut-pressing spring mounted in said holder unit below said rod to press said nut into resilient engagement with the threads of the screw, said vertically-disposed cavity having a side aperture and said holder unit sleeve being provided with a registering opening, said rod being provided with a side-actuating member extending laterally from said rod through both of said openings, and an additional actuating member extending through said sleeve and engaging said rod axially for treadle operation.

3. A screw-actuated vise embodying, in combination, a supporting body portion provided with a fixed jaw, said body portion having a horizontally-disposed cavity and a cylindrical vertically-disposed cavity communicating therewith, a movable jaw having a shank portion slidable within said horizontally-disposed cavity, an actuating screw having screw-threads mounted for rotary movement only within said shank portion of the movable jaw, a sectional nut provided with threads arranged to have an operative engagement with the threads of said screw, a cylindrical holder unit for said sectional nut mounted in said vertically-disposed cavity, a separable base mounted to swivel on said holder unit, means on said body portion for positioning and locking said base and body together, a jaw-opening spring disposed between said supporting body portion and said movable jaw and adapted, upon manual release of the screw-threads from said sectional nut, to move the movable jaw into open position, means for yieldingly forcing the threads of said sectional nut into operative engagement with the threads of said screw, and means connected with said holder unit for manually releasing said sectional nut from operative engagement with said screw.

WILLIAM GORDON.